Nov. 18, 1969 H. C. BANAS Re. 26,711
EMERGENCY OPENING LATCH
Original Filed March 11, 1966
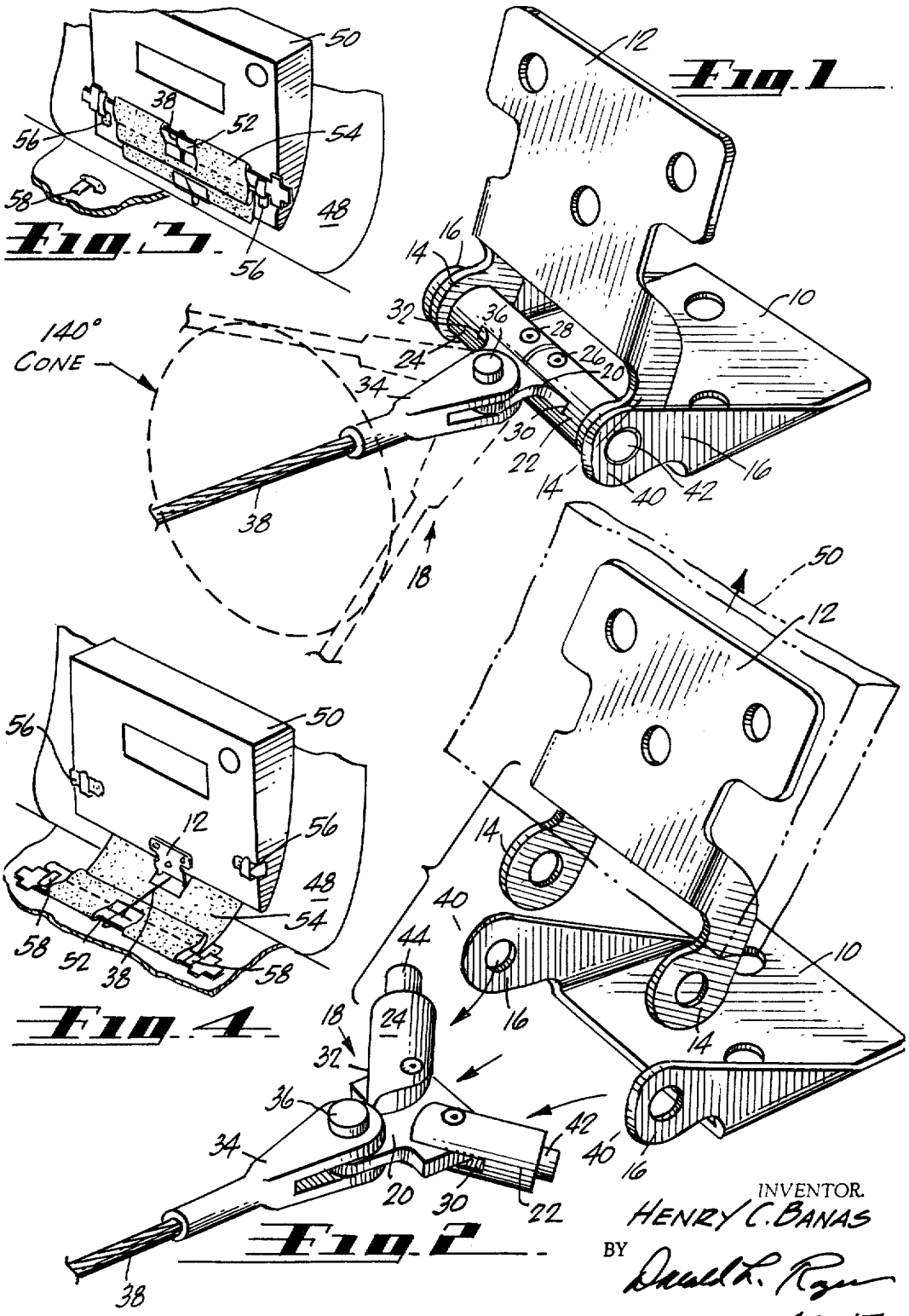

United States Patent Office

Re. 26,711
Reissued Nov. 18, 1969

26,711
EMERGENCY OPENING LATCH

Henry C. Banas, Costa Mesa, Calif., assignor, by mesne assignments, to McDonnell Douglas Corporation, Santa Monica, Calif., a corporation of Maryland Original No. 3,338,609, dated Aug. 29, 1967, Ser. No. 533,468, Mar. 11, 1966. Application for reissue Oct. 2, 1967, Ser. No. 682,689
Int. Cl. E05c *9/04, 15/02*
U.S. Cl. 292—21 5 Claims

Matter enclosed in heavy brackets [ ] appears in the original patent but forms no part of this reissue specification; matter printed in italics indicates the additions made by reissue.

*ABSTRACT OF THE DISCLOSURE*

*A hinge pin type of latch which securely fastens a flange located on an aircraft door to a flange located on an emergency slide container. The hinge pin is composed of three separate sections, a centrally located section and two outer sections. The outer sections are pivotally mounted to the central section and establish an over-center locking action which maintains the latching of the flanges. A pulling force applied to the central section causes the outer sections of the pin to pivot toward the central sections and be dislodged from the flanges, thereby opening the container*

This invention relates to a latch and more particularly to a latch which is to be employed in an emergency door of an aircraft.

In the commercial transportation field it is necessary to include in the vehicles a means to permit emergency evacuation of the passengers. In land vehicles such a problem can be easily solved by means of a door or doors and stairway arrangement. However, emergency evacuation means in aircraft have always been a problem. The problem is further complicated in aircraft as aircraft are more subject to fire and explosion requiring quick passenger evacuation. Also, the aircraft fuselage is spaced several feet above the ground which requires some means to allow the passengers to descend without injury.

Therefore, it is required that upon opening a door of an aircraft in an emergency, a passenger evacuation slide is deployed within a few seconds. Such a slide can be conveniently mounted on the inside of an aircraft door within a container, the slide being inflatable. The container must be opened as quick as possible without any delay. It is also desirable that upon the single opening movement of the aircraft door, the container is opened and the slide is employed automatically.

A latch which is required to open and close such a container must be of sufficient strength to retain high loads, be positive in retention, be reusable, require low opening force to be applied from several different directions, yet be small enough to present no obstacle to the passengers emerging from the aircraft by the evacuation slide. The latch of this invention accomplishes the above objectives with great assurance.

Briefly the latch of this invention relates to a hinge pin type of the latch which securely fastens a flange located on the aircraft door to a flange located on the side container. The hinge pin is composed of three separate sections, a centrally located section and two outer sections. The outer sections are pivotally mounted to the central section and establish an over-center locking action which maintains the latching of the flanges. A pulling force applied to the central section causes the outer sections of the pin to pivot toward the central sections and be dislodged from the flanges, thereby opening the container.

Other objects and features of the invention will become apparent as the description proceeds, particularly when taken in conjunction with the accompanying drawings illustrating the invention wherein:

FIGURE 1 is a perspective view of the latch of this invention in the operable position;

FIG. 2 is an exploded view of the latch of this invention showing the latch when disassembled;

FIG. 3 is a view showing the latch as installed in the evacuation slide container; and FIG. 4 is a view similar to FIG. 3 but showing the container in the ready emergency condition.

The description of the latch per se without regard for its particular installation will be had noting particularly FIGURES 1 and 2. In FIGURES 1 and 2 flanges 10 and 12 are shown, flange 10 to be fixed to the aircraft and flange 12 to be mounted on the evacuation slide container. Each flange 10 and 12 has protruding arms 14 and 16, respectively, arms 14 being adapted to contact arms 16. Pin 18 is to be mounted between arms 14 and 16 when in the operative position.

Pin 18 is composed of a central section 20 and pivotal outer sections 22 and 24. Central section 20 is substantially T-shaped with outer sections 22 and 24 pivotally secured to the outer edges of the T member by means of pivot pins 26 and 28, respectively. Outer sections 22 and 24 are substantially cylindrical in shape with the pivot pins 26 and 28 mounted off center toward the top portion of the central section 20. Outer sections 22 and 24 contain slots 30 and 32, respectively, the edges of the T-shaped central section 20 being pivotal within said slots. The depth of each slot 30 and 32 is sufficient to permit the outer sections 22 and 24 to assume a straight line configuration. On the single leg of the T-shaped central section 20 a rotating member 34 is pivotally secured by means of pivot pin 36. Rotating member 34 and outer sections 22 and 24 are pivotal within a single plane, the plane of the T-shaped central section. A lanyard 38 is affixed to the rotating member 34 which is to be the means to disengage the latch from the flanges 10 and 12. As can be seen from the drawing this particular arrangement has a unique advantage. The outer sections 22 and 24 when established between the flanges 10 and 12 by means of protuberances 42 and 44 on the outer portion of each outer section 22 and 24, respectively, in apertures in the arms 14 and 16. The resultant installation operates similar to a hinge in that they can be rotated about a center line through the arms 14 and 16. Rotating member 34 is rotatable on central section 20 about a center line through pivot pin 36, the rotation being perpendicular to the rotation of the outer sections 22 and 24. By such rotation a disconnection force applied through lanyard 38 within the confines of the cone shown in dotted lines in FIG. 1 will disconnect the latch. It has been found that a cone of about 140° is more than adequate.

Because of the over-center locking action of the outer sections 22 and 24, only a relatively small release force is required. However, while latched the locking action is sure and positive, it being impossible to accidentally remove the latch. Upon disengagement, the latch can be easily reinstalled thereby negating the use of another latch pin. The latch is reinstalled by manually inserting the outer sections 22 and 24 into the arms 14 of flange 12 establishing the over-center locking action. The container is then closed causing the arms 14 to contact the arms 16 of flange 10. The arms 16 are flared as at 40 to facilitate ease of connection.

In FIGURES 3 and 4 is shown a slide container mounted on an aircraft door 48 with the latch of this invention affixed thereto. In FIG. 3 the container 50 is closed with the latch of this invention preventing opening of the container 50. A bar 52 is provided which is connected to an extended portion 54 of the evacuation slide contained within the container 50. When the door 48 is not to be used for an emergency purpose, the bar 52 is mounted on the front of the container 50 by clips 56 as shown in FIG. 3. In this manner no relative movement is established between the container 50 and the bar 52 which would cause the opening of the container.

In FIG. 4 the bar 52 is mounted preparatory to an emergency. Bar 52 is fixed to the interior floor of the aircraft by means of fastening means 58. The lanyard 38 is of a length that when bar 52 is in this position the lanyard is taut. Also, the extended portion of the slide 54 is taut in this position.

The operation of the slide is as follows: As the aircraft door 48 is opened a pulling force is applied through lanyard 38 operating on the central section 20 of the pin 18. Thereupon, the outer sections 22 and 24 are withdrawn from the arms 14 and 16 causing the container to be opened. As the aircraft door 48 is opened further the slide is withdrawn from the container as extended portion 54 is attached to the bar 52. The evacuation slide falls free by the pull of gravity and is automatically inflated. The total time lapse from the opening of the aircraft door to the inflation of the evacuation slide (ready for use) in less than eight seconds. Such speed is absolutely necessary in some emergency situations.

Having thus described the invention in relation to an evacuation slide in an aircraft, it is to be understood that the invention should in no way be limited thereto, but is applicable in other environments whenever a quick release latch is desired.

I claim:

1. [An emergency opening latch comprising:] *A combination, for opening an evacuation slide container in an aircraft, comprising:*

*a first flange member fixedly secured to the aircraft;*

*a second flange member fixedly secured to the evacuation slide container;*

*a removable connecting pin having:* a central coupling section [having a depending leg portion and upper transverse arm portions];

[an] outer section*s* pivotally connected to [each of said upper transverse arm portions] *said central coupling section*, said outer sections being pivotal from a substantial in-line arrangement to a position approximately at a right angle therefrom, said outer sections establishing an over-center locking action when in said in-line arrangement, said outer sections being rotatably *connected* [connectable] to [a fixed member] *said first and second flange members* establishing a hinge type of [action] *connection;*

[an arm member pivotally secured to said central coupling section at said depending leg portion;] and a releasing means being [secured] *connected* to said [arm member] *central coupling section* whereby upon an adequate pulling force exerted upon said releasing means, said outer sections are pivoted with respect to said central *coupling* section and disengaged from said *flange members* [fixed member].

2. [An emergency opening latch as defined in] *the combination of* claim 1 wherein:

said releasing means is a lanyard.

3. *The combination of claim 1 wherein:*

*said releasing means being pivotally connected with respect to said central coupling section.*

4. *An emergency opening latch comprising:*

*a central coupling section having a depending leg portion and upper transverse arm portions;*

*an outer section pivotally connected to each of said upper transverse arm portions, said outer section being pivotal from a substantial in-line arrangement to a position approximately at a right angle therefrom, said outer section establishing an over-center locking action when in said in-line arrangement, said outer section being rotatably connectable to a fixed member establishing a hinge type of action;*

*an arm member pivotally secured to said central coupling section at said depending leg portion; and*

*a releasing means being secured to said arm member whereby upon an adequate pulling force exerted upon said releasing means, said outer section is pivoted with respect to said central section and disengaged from said fixed member.*

5. *The emergency opening latch of claim 1 wherein: said releasing means is a lanyard.*

References Cited

The following references, cited by the Examiner, are of record in the patented file of this patent or the original patent.

UNITED STATES PATENTS

| | | | |
|---|---|---|---|
| 566,856 | 9/1896 | Frost | 292—6 |
| 2,461,693 | 2/1949 | McAloon | 24—265 |
| 2,931,205 | 4/1960 | Schmitz | 292—92 X |
| 2,292,386 | 8/1942 | Manson | 244—122 |

FOREIGN PATENTS

| | | |
|---|---|---|
| 1,008,030 | 5/1957 | Germany. |

MARVIN A. CHAMPION, Primary Examiner

J. R. MOSES, Assistant Examiner